United States Patent
Jeong et al.

(10) Patent No.: US 9,889,840 B2
(45) Date of Patent: Feb. 13, 2018

(54) VEHICLE AND METHOD FOR IMPROVING FUEL-EFFICIENCY DURING TEMPORARY STOP

(71) Applicants: Hyundai Motor Company, Seoul (KR); Kia Motors Corporation, Seoul (KR)

(72) Inventors: Dong-Hoon Jeong, Osan-si (KR); Hyun-Seung Suh, Yongin-si (KR); Myong-Chan Kim, Seoul (KR); Woo-Jin Chang, Suwon-si (KR); Moo-Suk Kim, Hwaseong-si (KR); Kyoo-Ho Lee, Seoul (KR); Hyun-Ku Lee, Seoul (KR); Sang-Bum Baek, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 259 days.

(21) Appl. No.: 14/720,333

(22) Filed: May 22, 2015

(65) Prior Publication Data
US 2016/0107650 A1    Apr. 21, 2016

(30) Foreign Application Priority Data
Oct. 21, 2014    (KR) .................. 10-2014-0142549

(51) Int. Cl.
*B60W 10/06*    (2006.01)
*B60W 10/115*    (2012.01)
(Continued)

(52) U.S. Cl.
CPC .......... *B60W 10/115* (2013.01); *B60W 10/06* (2013.01); *B60W 30/18054* (2013.01);
(Continued)

(58) Field of Classification Search
CPC .......... F16H 2059/446; B60W 10/115; B60W 30/18054; B60W 10/06; B60W 2510/101;
(Continued)

(56) References Cited

U.S. PATENT DOCUMENTS

| 2002/0117338 A1* | 8/2002 | Itou .................. B60W 30/1819 |
| | | 180/54.1 |
| 2004/0166988 A1* | 8/2004 | Zimmermann ....... B60W 10/06 |
| | | 477/71 |

(Continued)

FOREIGN PATENT DOCUMENTS

| JP | 11-230327 A | 8/1999 |
| JP | 2005-036824 A | 2/2005 |

(Continued)

OTHER PUBLICATIONS

English translation of JP2012167587, translationportal.epo.org, dated Jun. 28, 2017.*

*Primary Examiner* — Roger L Pang
(74) *Attorney, Agent, or Firm* — Morgan, Lewis & Bockius LLP

(57) ABSTRACT

A method for improving fuel-efficiency during a temporary stop may include dividing, by an engine control apparatus, a neutral control condition into a neutral control entry and a neutral control release during a D-stage temporary stop, determining, a neutral control entry D-stage target RPM at a time of the neutral control entry, and a neutral control release D-stage target RPM at a time of the neutral control release, and RPM shifting the neutral control entry D-stage target RPM to a speed gradient conforming to a transmission clutch release time of a transmission control apparatus at a time of a neutral control after the neutral control entry and RPM shifting the neutral control release D-stage target RPM to a speed gradient conforming to a clutch coupling time of (Continued)

a transmission by the transmission control apparatus at a time of a neutral control after the neutral control release.

12 Claims, 9 Drawing Sheets

(51) Int. Cl.
*B60W 30/18* (2012.01)
*F16H 61/00* (2006.01)
*B60W 30/20* (2006.01)
*F16H 61/02* (2006.01)
*F16H 59/44* (2006.01)

(52) U.S. Cl.
CPC ............ *B60W 2030/206* (2013.01); *B60W 2510/0676* (2013.01); *B60W 2510/101* (2013.01); *B60W 2510/1005* (2013.01); *B60W 2520/04* (2013.01); *B60W 2710/0644* (2013.01); *B60W 2710/1005* (2013.01); *F16H 2059/446* (2013.01); *F16H 2061/0015* (2013.01); *F16H 2061/0234* (2013.01); *Y10T 477/688* (2015.01)

(58) Field of Classification Search
CPC ... B60W 2030/206; B60W 2510/1005; B60W 2710/0644; B60W 2520/04; B60W 2510/0676; B60W 2710/1005; Y10T 477/688
See application file for complete search history.

(56) References Cited

U.S. PATENT DOCUMENTS

| | | | |
|---|---|---|---|
| 2005/0003930 A1* | 1/2005 | Hopper | B60W 10/06 477/175 |
| 2005/0027424 A1* | 2/2005 | Matsubara | F16H 61/20 701/51 |

FOREIGN PATENT DOCUMENTS

| | | |
|---|---|---|
| JP | 2010-216356 A | 9/2010 |
| JP | 2012-167587 A | 9/2012 |

\* cited by examiner

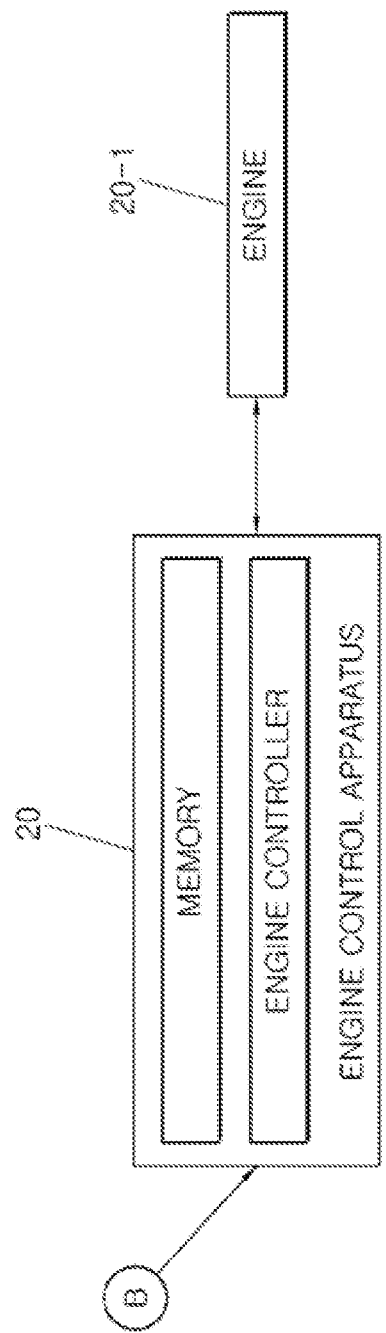

VEHICLE AND METHOD FOR IMPROVING FUEL-EFFICIENCY DURING TEMPORARY STOP

CROSS-REFERENCE TO RELATED APPLICATIONS

The present application, U.S. patent application Ser. No. 14/720,333, filed May 22, 2015, claims priority to Korean Patent Application No. 10-2014-0142549, filed Oct. 21, 2014, the entire contents of which are incorporated herein for all purposes by these references.

BACKGROUND OF THE INVENTION

Field of the Invention

Various embodiments of the present invention relate to improvement in fuel-efficiency during a temporary stop, and more particularly, to a vehicle and a method for improving fuel-efficiency during a temporary stop capable of improving both of fuel-efficiency and noise, vibration, hashness (NVH) by reducing planetary gear noise and vehicle vibration which occur at the time of a neutral control during a D-stage temporary stop.

Description of Related Art

Generally, an automatic transmission for a vehicle includes a shift control apparatus which automatically controls a shift ratio depending on a driving speed and a load of a vehicle, in which the shift control apparatus controls a plurality of clutches and brakes, which are installed in a gear train, in an operation state or a non-operation state to control an RPM of an output stage of a planetary gear, thereby performing a shift.

In particular, under the condition that the improvement in fuel-efficiency of a vehicle has emerged as a very important issue, efforts to improve fuel-efficiency of an automatic transmission vehicle have been conducted. An example of the efforts may include a neutral control method.

The neutral control is a control method of making a clutch in a half neutral state at the time of a D-stage temporary stop in the automatic transmission vehicle configured of planetary gear sets to lower an engine load and lower fuel consumption, thereby improving the fuel-efficiency.

However, the neutral control brings about a rotating planetary gear set by a clutch release among the planetary gear sets which are not rotating by making the clutch in the half neutral state at the time of the D-stage temporary stop to which the neutral control is not applied and induces the gear noise due to the rotation of the planetary gear set. Therefore, at the time of the D-stage temporary stop in the automatic transmission vehicle configured of the planetary gear sets, the neutral control cannot but improve the fuel-efficiency but induce the planetary gear noise.

Usually, the planetary gear noise at the time of the neutral control may be improved by reducing a D-stage engine RPM at the time of the temporary stop and thus reducing the rotation of the planetary gear.

However, since the automatic transmission configured of the planetary gear sets does not usually use the neutral control at the time of the D-stage temporary stop, the D-stage engine RPM is set to be high to avoid a resonance frequency of a vehicle, and thus the low D-stage engine RPM for the neutral control at the time of the D-stage temporary stop cannot but coincide with the resonance frequency of the vehicle and the neutral control implementing vehicle brings about the vehicle vibration due to the coincidence with the resonance frequency of the vehicle.

Therefore, to improve the fuel-efficiency of the automatic transmission vehicle configured of the planetary gear sets, there is a need to solve two conflicting phenomena of the low D-stage engine RPM to reduce the planetary gear noise and the avoidance of the resonance frequency of the vehicle bringing about the vehicle vibration at the time of the neutral control.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle and a method for improving fuel-efficiency during a temporary stop capable of reducing planetary gear noise while avoiding a resonance frequency of the vehicle at the time of the application of a neutral control and improving both of fuel-efficiency and NVH due to the reduction in the planetary gear noise and vehicle vibration, by dividing a D-stage engine RPM of an automatic transmission vehicle configured of planetary gear sets into a D-stage temporary stop to which the neutral control is applied and a D-stage temporary stop to which the neutral control is not applied so as to make the D-stage engine RPM different.

According to various aspects of the present invention, a method for improving fuel-efficiency during a temporary stop may include (A) dividing, by an engine control apparatus, a neutral control condition into a neutral control entry and a neutral control release during a D-stage temporary stop, (B) determining, a neutral control entry D-stage target RPM at a time of the neutral control entry, and a neutral control release D-stage target RPM at a time of the neutral control release, and (C) RPM shifting the neutral control entry D-stage target RPM to a speed gradient conforming to a transmission clutch release time of a transmission control apparatus at a time of a neutral control after the neutral control entry and RPM shifting the neutral control release D-stage target RPM to a speed gradient conforming to a clutch coupling time of a transmission by the transmission control apparatus at the time of a neutral control after the neutral control release.

In the (B), the neutral control entry D-stage target RPM and the neutral control release D-stage target RPM may be determined in a map built with a neutral control D-stage target RPM depending on cooling water temperature.

In the (B), performing the neutral control after the neutral control entry may include (b-1) determining an entry neutral control target RPM in the map built with the neutral control D-stage target RPM depending on the cooling water temperature by the engine control apparatus, (b-2) determining whether after the neutral control entry, a predetermined time elapses, and (b-3) performing the RPM shifting using the neutral control entry D-stage target RPM as the entry neutral control target RPM after the elapse of the predetermined time after the neutral control entry, while before the elapse of the predetermined time after the neutral control entry, the RPM shifting is performed using the neutral control entry D-stage target RPM as a release neutral control target RPM determined under a condition of the neutral control release and the entry neutral control target RPM considering the clutch release time.

The entry neutral control target RPM is N1M and may be stored in a memory of the engine control apparatus.

The elapse of the predetermined time after the neutral control entry may be the clutch release time of the transmission by the transmission control apparatus.

The neutral control D-stage target RPM determined after the elapse of the predetermined time after the neutral control entry may be determined as $N_1\text{target}=N1$, in which the $N_1\text{target}$ represents the neutral control D-stage target RPM before the release time and N1 represents the entry neutral control target RPM.

The neutral control D-stage target RPM determined before the elapse of the predetermined time after the neutral control entry may be determined as $N_2\text{target}=N_1\text{target}+(N1-N2M)/T1$, in which the $N_2\text{target}$ represents the neutral control D-stage target RPM after the release time, the $N_1\text{target}$ represents the neutral control D-stage target RPM before the release time, N1 represents the entry neutral control target RPM, N2M represents the release neutral control target RPM, and T1 represents the clutch release time.

In the (B), performing the neutral control release after the neutral control entry may include (b-1a) determining a release neutral control target RPM in the map built with the neutral control D-stage target RPM depending on the cooling water temperature by the engine control apparatus, (b-1b) determining whether the neutral control release is performing, (b-2a) determining whether a predetermined time elapses after the neutral control release entry when the neutral control release is performing, and (b-3a) performing the RPM shifting using the neutral control release D-stage target RPM as the release neutral control target RPM after the elapse of the predetermined time after the neutral control release complete or the neutral control release entry, while after the elapse of the predetermined time after the neutral control release entry, the RPM shifting is performed using the neutral control release D-stage target RPM as an entry neutral control target RPM determined under a condition of the neutral control release and the release neutral control target RPM considering the clutch release time.

The release neutral control target RPM is N2M and may be stored in a memory of the engine control apparatus.

The elapse of the predetermined time after the neutral control release may be the clutch coupling time of the transmission by the transmission control apparatus.

The neutral control D-stage target RPM determined after the elapse of the predetermined time after the neutral control release may be determined as $N_1\text{target}=N2$, wherein the $N_1\text{target}$ represents the neutral control D-stage target RPM before the coupling time and N2 represents the release neutral control target RPM.

The neutral control D-stage target RPM determined before the elapse of the predetermined time after the neutral control release may be determined as $N_2\text{target}=N_1\text{target}+(N2-N1M)/T2$, in which the $N_2\text{target}$ represents the neutral control D-stage target RPM after the coupling time, the $N_1\text{target}$ represents the neutral control D-stage target RPM before the coupling time, N2 represents the release neutral control target RPM, N1M represents the entry neutral control target RPM, and T2 represents the clutch coupling time.

According to various aspects of the present invention, a vehicle in which is embodied a method for improving fuel-efficiency during a temporary stop may include an engine control apparatus configured to control an engine, determine a neutral control entry D-stage target RPM and a neutral control release D-stage target RPM under a neutral control condition determined during a D-stage temporary stop, and include a memory storing a control value, a transmission control apparatus configured to control a transmission, perform a clutch release at a time of a neutral control entry performed and a clutch coupling at a time of a neutral release during the D-stage temporary stop, include a memory storing a control value, and mutually communicate with the engine control apparatus to provide the clutch release time and the clutch coupling time to the engine control apparatus, and a data detection apparatus configured to provide detection values detected by an engine RPM sensor, an accelerator pedal position sensor, a gear position sensor, a vehicle speed sensor, a transmission input speed sensor, a transmission output speed sensor, an acceleration sensor, a brake pressure sensor, and a cooling water temperature sensor, respectively, as input data of the engine control apparatus and the transmission control apparatus, respectively.

The engine control apparatus may be provided with a map considering cooling water temperature and determines a neutral control entry D-stage target RPM and a neutral control release D-stage target RPM using the map.

The engine control apparatus may be an engine electronic control unit (ECU), the transmission control apparatus may be a transmission control unit (TCU), and the transmission may be an automatic transmission configured of a clutch, a planetary gear set, and a pressure control apparatus.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A, FIG. 1B, and FIG. 1C are configuration diagrams of a vehicle and an exemplary method for improving fuel-efficiency during a temporary stop according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
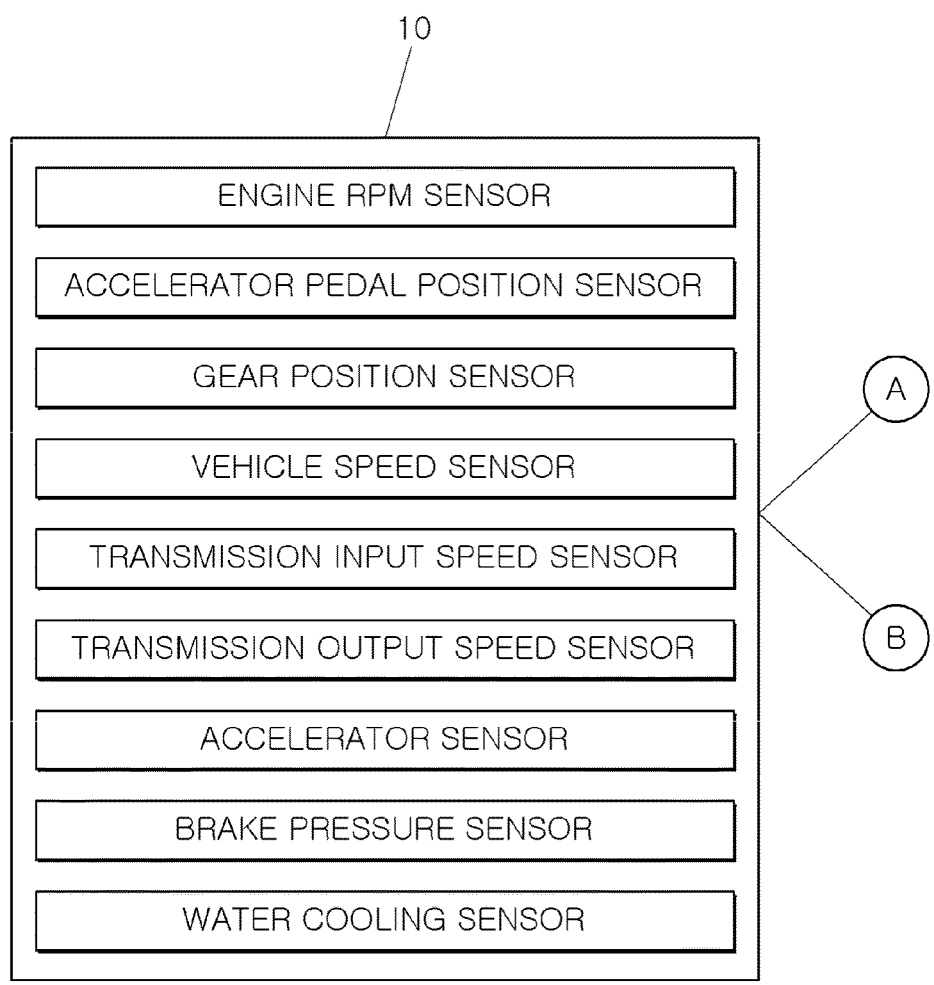
Figure 1B:
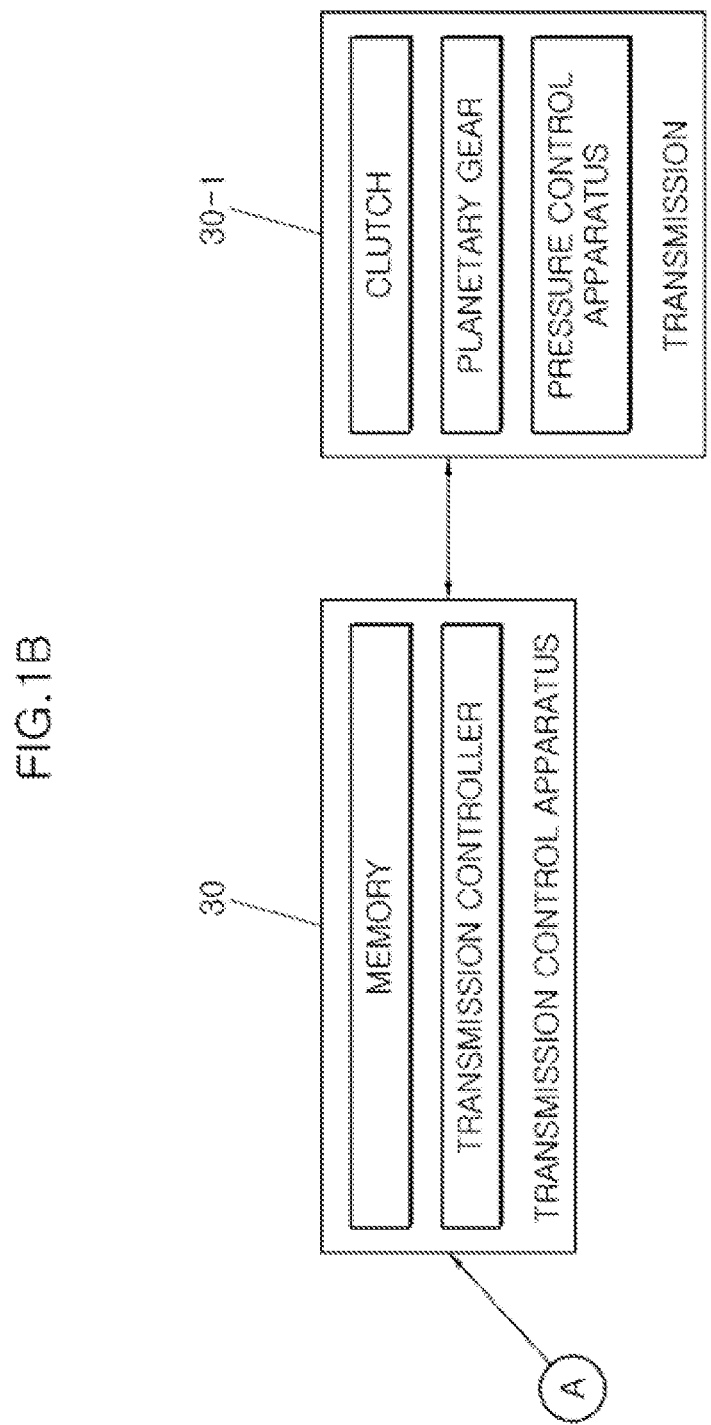

FIG. 1A, FIG. 1B, and FIG. 1C are configuration diagrams of a vehicle to which a method for improving fuel-efficiency during a temporary stop according to various embodiments of the present invention is applied.

As illustrated in FIG. 1A, FIG. 1B, and FIG. 1C, a vehicle includes a data detection apparatus 10 detecting various kinds of control values, an engine control apparatus 20 receiving data of the data detection apparatus 10 to perform a control of an engine 20-1, and a transmission control apparatus 30 receiving the data of the data detection apparatus 10 to perform a control of a transmission 30-1.

The data detection apparatus 10 includes an engine RPM sensor detecting an engine RPM, an accelerator pedal position sensor detecting an accelerator pedal stroke, a gear position sensor detecting a shift stage, a vehicle speed sensor detecting a vehicle speed, a transmission input speed sensor detecting a transmission input speed, a transmission output speed sensor detecting a transmission output speed, an acceleration sensor detecting a vehicle acceleration, and a brake pressure sensor detecting a braking pressure at the time of braking the vehicle. Further, although not illustrated, the data detection apparatus 10 includes a water temperature sensor detecting a temperature of engine cooling water.

The engine control apparatus 20 includes a memory for data storage and an engine controller which reads a storage value of the memory to control the engine 20-1. Further, the engine control apparatus 20 is equipped with a map in which target RPMs at the time of a D-stage temporary stop for each cooling water temperature of engine cooling water are calculated. Therefore, as the engine control apparatus 20, an engine electronic control unit (ECU) may be used. In particular, the engine control apparatus 20 mutually communicates with a transmission control apparatus to implement a cooperative control.

The transmission control apparatus includes a memory for data storage and a transmission controller which reads a storage value of the memory to control the transmission 30-1. Further, the transmission control apparatus 30 may be equipped with the map in which the target RPMs at the time of the D-stage temporary stop for each cooling water temperature of the engine cooling water are calculated. Therefore, as the transmission control apparatus 30, a transmission control unit (TCU) may be used. In particular, the transmission control apparatus 30 mutually communicates with the engine control apparatus 20 to implement a cooperative control.

The transmission 30-1 is an automatic transmission which is configured of a clutch, planetary gear sets, and a pressure control apparatus and implements a neutral control at the time of the D-stage temporary stop to improve fuel-efficiency. Therefore, the transmission 30-1 is an automatic transmission which is configured of the planetary gear sets.

Figure 2A:
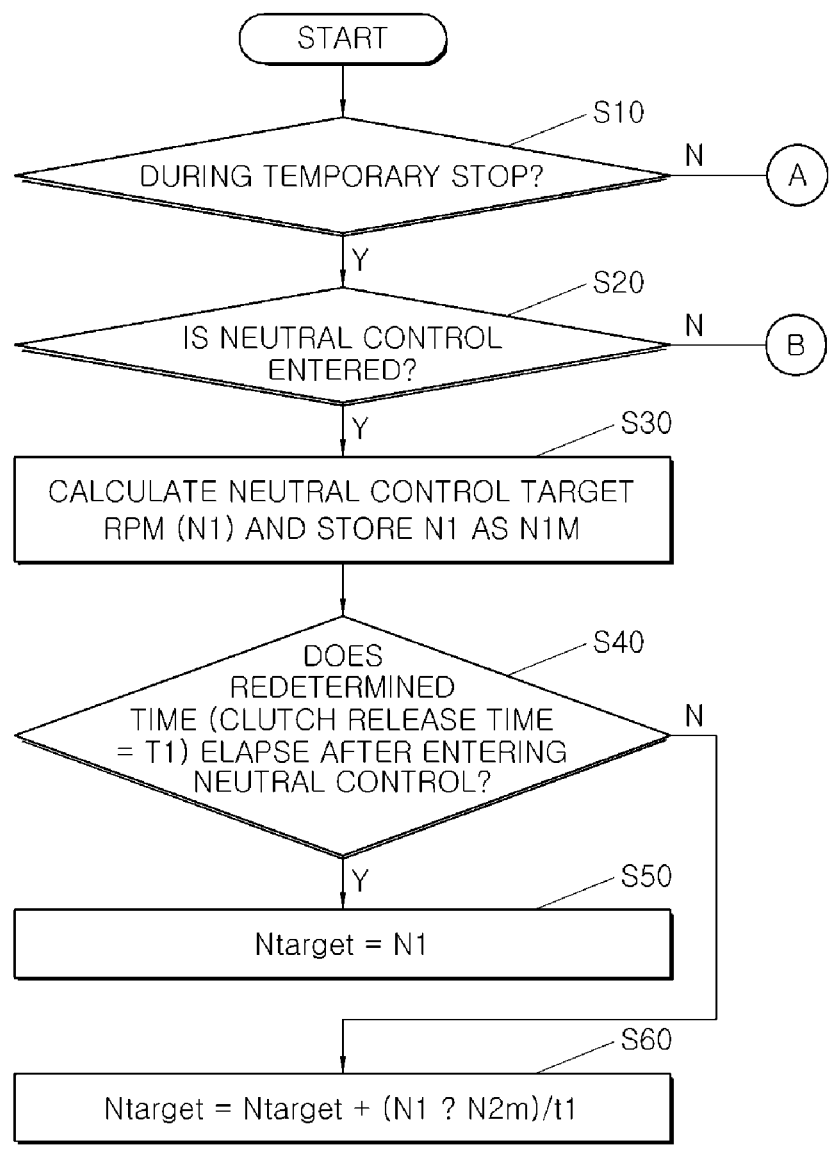
FIGS. 2A and 2B are flow charts of the exemplary method for improving fuel-efficiency during a temporary stop of a vehicle which is in a temporary stop state according to the present invention.
Figure 2B:
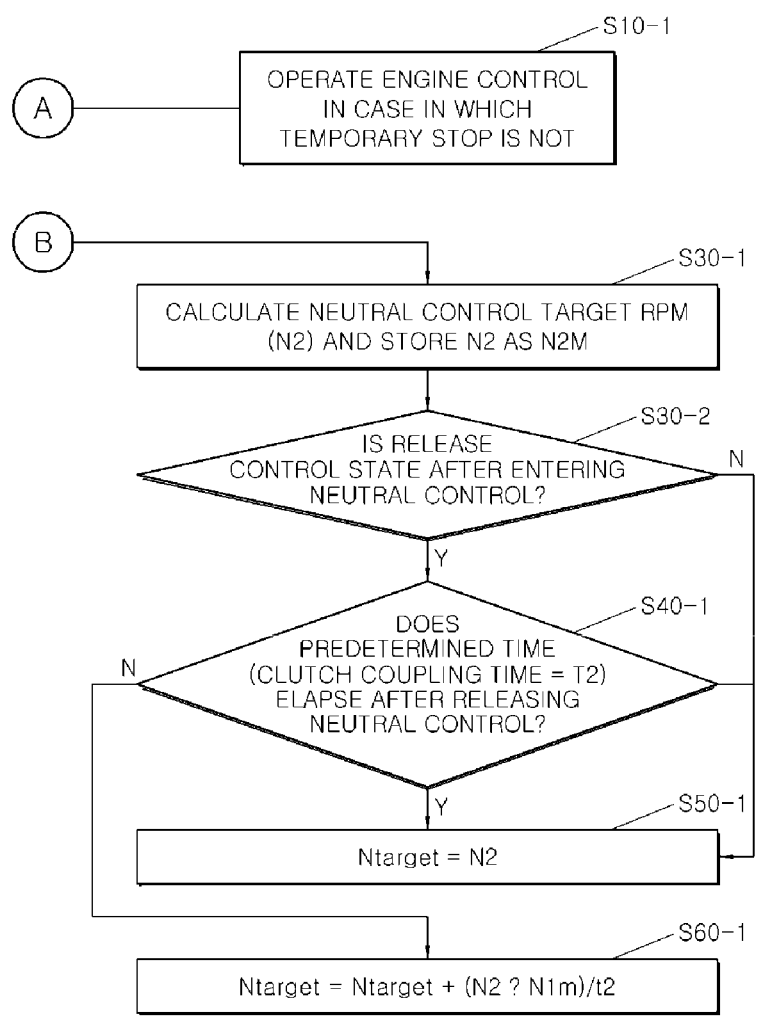

FIGS. 2A and 2B are flow charts of a neutral control method for improving fuel-efficiency during a temporary stop of a vehicle which is in the D-stage temporary stop state according to various embodiments of the present invention, in which the neutral control method is applied to an automatic transmission vehicle configured of the planetary gear sets and the neutral control method to be described below is performed by the engine control apparatus 20 and the transmission control apparatus 30.

S10 is a step of determining whether a vehicle is in a temporary stop. This is determined by the engine control apparatus 20 using data received from the data detection apparatus 10. For example, the engine controller of the engine control apparatus 20 reads detection values of a vehicle sensor, an acceleration sensor, or an engine RPM sensor of the data detection apparatus 10 to determine whether a vehicle is in a temporary stop. Further, the temporary stop of the vehicle may be determined based on the engine RPM which is generally determined as idle.

If it is determined in S10 that the vehicle is not in the temporary stop, the neutral control method proceeds to S10-1, and thus the engine control apparatus 20 generally controls the engine 20-1 at the time of driving and the transmission control apparatus 30 controls the transmission 30-1 with a general transmission control from which the neutral control is excluded at the time of the D-stage temporary stop. In this case, as in target engine RPM table 2 illustrated in FIG. 3A and FIG. 3B, the map in which the target RPM is calculated depending on the cooling water temperature is inactivated by a neutral control on.

On the other hand, if it is determined from the determination result of S10 that the vehicle is in the temporary stop state, the neutral control method enters S20, and thus it is determined before and after the neutral control entry. In this case, the neutral control entry is determined by the engine control apparatus 20 using the data received from the data detection apparatus 10. For example, the engine controller of the engine control apparatus 20 recognizes the D stage using a detection value of the gear position sensor of the data detection apparatus 10 stored in the memory to determine that the vehicle is in the current D-stage temporary stop. However, the determination on whether the vehicle enters the neutral control is performed by the transmission control apparatus 30 and then may be applied to the engine control apparatus 20.

S20 is a step of determining whether the vehicle is in the neutral control entry state or the neutral control release state by the engine control apparatus 20. If it is determined in S20 that the vehicle is in the neutral control entry state, the vehicle enters the neutral control performed in steps S30 to S60, while if it is determined in S20 that the vehicle is not in the neutral control entry state, the vehicle enters the neutral control release performed in S30-1 to S60-1.

S30 is a step of calculating an entry neutral control target RPM (hereinafter, N1) depending on the neutral control performance, defining the calculated N1 as N1M, and then storing the N1M in the memory of the engine control apparatus 20. This is calculated by using the map in which the target RPMs at the time of the D-stage temporary stop for each cooling water temperature are calculated. The N1 calculation in S30 is exemplified in FIG. 3A and FIG. 3B. As in a target engine RPM table 1, the map in which the target RPM is calculated depending on the cooling water temperature is activated by the neutral control on, and thus the N1 is calculated as a neutral control on target RPM depending on the cooling water temperature.

S40 is a step of determining whether the clutch of the transmission 30-1 is released by the transmission control apparatus 30 after the neutral control is performed. To this end, the elapse of a clutch release time T1 which is performed at the time of performing the neutral control is checked. In this case, whether the clutch release time T1 elapses determines a relationship between the N1 and the neutral control entry D-stage target RPM (hereinafter, $N_1$target).

S50 is a case in which it is determined in S40 that the clutch release time T1 elapses a preset time. In this case, the $N_1$target is determined as N1 by the following Equation 1.

Neutral control entry D-stage target RPM after
release time: $N_1$target=$N1$        Equation 1.

S60 is a case in which it is determined in S40 that the clutch release time T1 does not elapse the preset time. In this case, to determine the $N_2$target, a release neutral control target RPM N2M and the clutch release time T1 which are calculated at the time of the neutral control release are considered.

Neutral control entry D-stage target RPM before
release time: $N_2$target=$N_1$target+$(N1-N2M)/T1$        Equation 2

In the Equation 2, N2M is a value of the release neutral control target RPM obtained by calculating the release neutral control target RPM N2 at the time of the neutral control release, defining the N2 as N2M, and then storing the N2M in the memory. The N2 and N2M will be described in detail in S30-1.

Figure 3A:
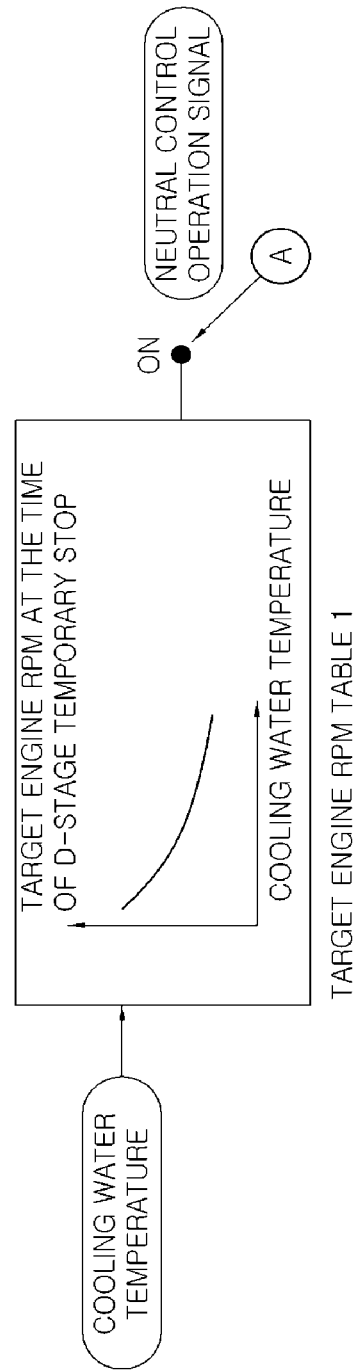
FIG. 3A.
Figure 3B:
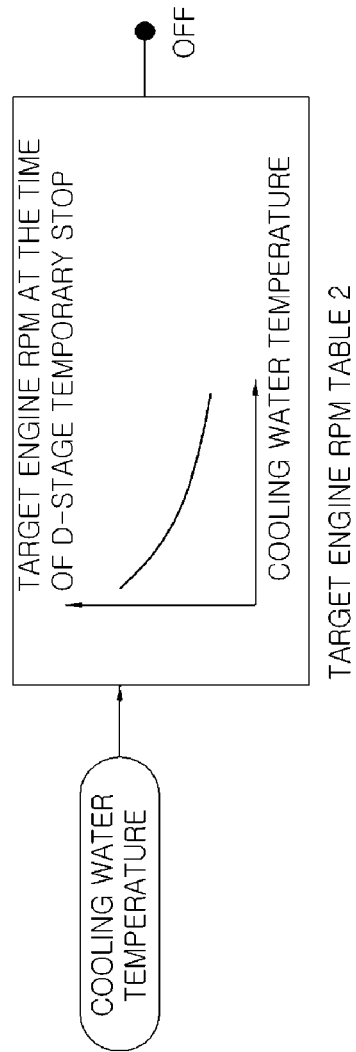
FIG. 3B, FIG. 3C, and FIG. 3D are examples of a map diagram illustrating the exemplary method for improving fuel-efficiency during a temporary stop according to the present invention.
Figure 3C:
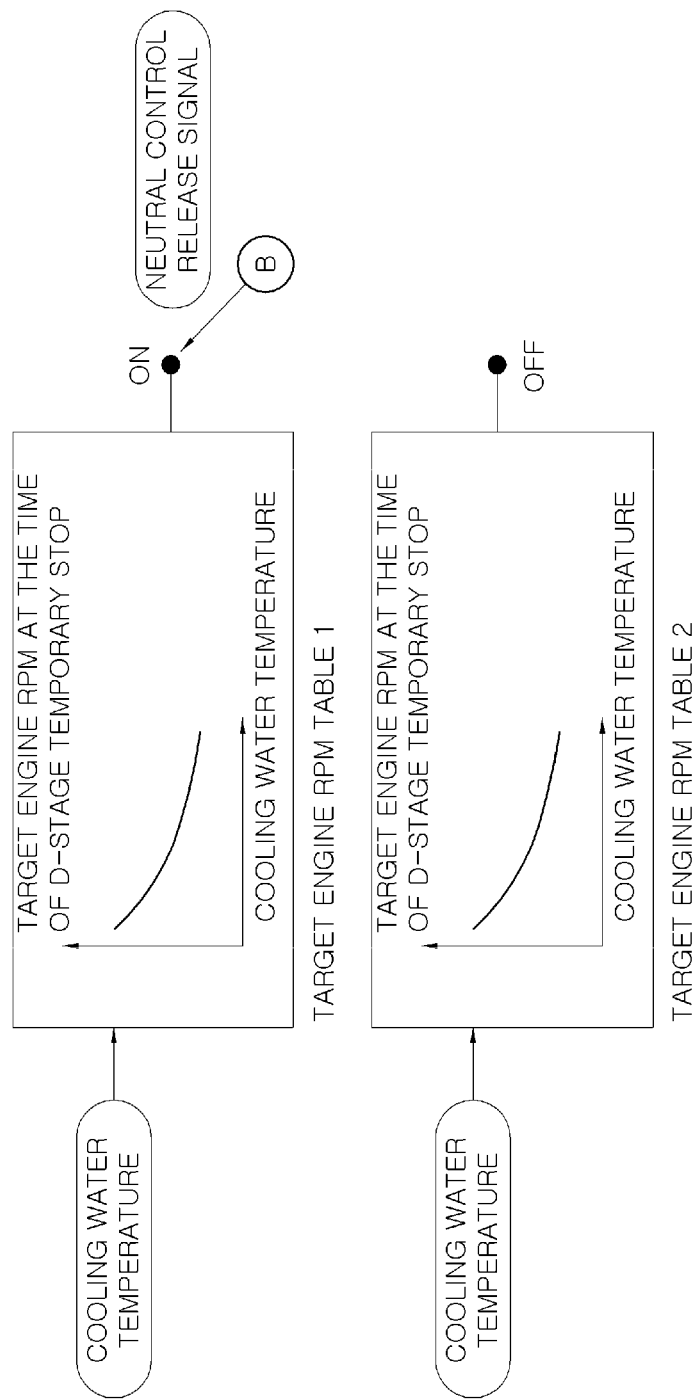

S30 to S60 are exemplified in FIG. 3A and FIG. 3B. As in the target engine RPM table 1 of FIG. 3A and FIG. 3B, the map in which the target RPM is calculated depending on the cooling water temperature is activated by the neutral control on, and thus the N1 is calculated as the neutral control on target RPM depending on the cooling water temperature. The transmission control apparatus 30 releases the clutch so that the transmission 30-1 enters the neutral control, and at the same time, the engine control apparatus 20 performs RPM shifting from the neutral control D-stage engine RPM to the $N_1$target of S50 or the $N_2$target of S60 depending on the clutch release. In particular, the RPM shifting speed has a speed gradient conforming to the clutch release time, and thus a gradient between a neutral control off target RPM and the neutral control on target RPM may be continued in a smoothly changed state. As the result, at the time of performing the neutral control, even though the neutral control D-stage target RPM is higher than the D-stage target RPM when the neutral control is not applied, a sense of difference due to the sudden change in the engine RPM is minimized.

Meanwhile, S30-1 is a step of calculating the release neutral control target RPM (hereinafter, N2) depending on the neutral control release, defining the calculated N2 as N2M, and then storing the N2M in the memory of the engine control apparatus 20. This is calculated by the engine control apparatus 20 using the map in which the target RPMs at the time of the D-stage temporary stop for each cooling water temperature are calculated. The N2 calculation in S30-1 is exemplified in FIGS. 3A and 3B. As in the target engine RPM table 1, the map in which the target RPM is calculated depending on the cooling water temperature is in activated by the neutral control on, and thus the N2 is calculated as the neutral control on target RPM depending on the cooling water temperature. That is, this is the same as the calculation of the neutral control target RPM N1 of S30.

Figure 3D:
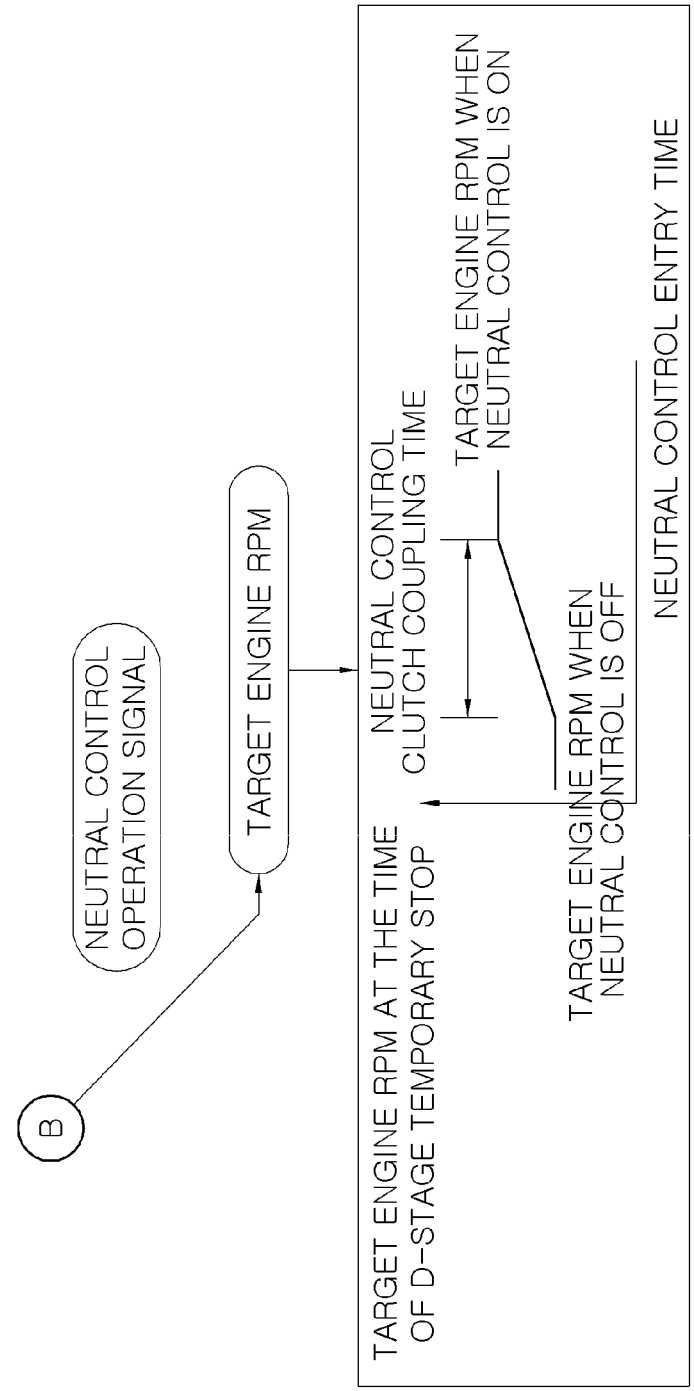

S30-2 is a step of determining whether the vehicle is in the neutral control release state. If it is determined in S30-2 that the vehicle is in the neutral control release state, the neutral control method enters S40-1 which is exemplified in FIG. 3D, while if it is determined in S30-2 that the vehicle is in the neutral control release complete state, the neutral control method enters S50-1.

S40-1 is a step of determining whether the clutch of the transmission 30-1 is coupled by the transmission control apparatus 30 during the neutral control release. To this end, the elapse of clutch coupling time T2 which is performed at the time of the neutral control release is checked. In this case, whether the clutch coupling time T2 elapses determines a relationship between the N1 and the neutral control release D-stage target RPM (hereinafter, Ntarget).

S50-1 is a case in which it is determined in S30-2 that the vehicle is in the neutral control release complete state and it is determined in S40-1 that the clutch coupling time T2 elapses a preset time. In this case, the $N_1$target is determined as the N2 by the following Equation 3.

Neutral control release D-stage target RPM after
coupling time: $N_1$target=$N2$        Equation 3

S60-1 is a case in which it is determined in S40-1 that the clutch coupling time T2 does not elapse the set time. In this case, to determine the $N_2$target, the entry neutral control target RPM N1M and the clutch coupling time T2 which are calculated at the time of the neutral control entry are considered.

Neutral control release D-stage target RPM before
coupling time: $N_2$target=$N_1$target+$(N2-N1M)/T2$        Equation 4

In the Equation 4, N1M is a value of the entry neutral control target RPM obtained by calculating the entry neutral control target RPM N1 at the time of performing the neutral control, defining the N2 as N2M, and then storing the N2M in the memory. The N2 and the N2M are described in S30.

S30-1 to S60-1 are exemplified in FIG. 3A and FIG. 3B which describe the neutral control entry. In this case, a neutral control entry condition is only changed to a neutral control release condition. Therefore, as in the target engine RPM table 1 of FIGS. 3A and 3B, the map in which the target RPM is calculated depending on the cooling water temperature is in activated by the neutral control on, and thus the N2 is calculated as the neutral control on target RPM depending on the cooling water temperature. The transmission control apparatus 30 couples the clutch so that the transmission 30-1 enters the neutral control, and at the same time, the engine control apparatus 20 performs RPM shifting from the neutral control D-stage engine RPM to the $N_1$target of S50-1 or the $N_2$target of S60-1 depending on the clutch coupling. In particular, the RPM shifting speed has a speed gradient conforming to the clutch coupling time, and thus a gradient between the neutral control off target RPM and the neutral control on target RPM may be continued in a smoothly changed state. As the result, at the time of releasing the neutral control, even though the neutral control release D-stage target RPM is higher than the D-stage target RPM when the neutral control is not applied, a sense of difference due to the sudden change in the engine RPM is minimized.

As described above, in the vehicle and the method for improving fuel-efficiency during a temporary stop, the D-stage target RPM and the neutral control release D-stage target RPM are each calculated by the engine control apparatus 20 under the neutral control condition determined during the D-stage temporary stop, and the neutral control entry D-stage target RPM is RPM shifted to the speed gradient conforming to the clutch release time of the transmission by the transmission control apparatus 30 at the time of the neutral control after the neutral control entry and the neutral control release D-stage target RPM is RPM shifted to the speed gradient conforming to the clutch coupling time of the transmission by the transmission control apparatus at the time of the neutral control after the neutral control release, thereby reducing the planetary gear noise while avoiding the resonance frequency of the vehicle at the time of the application of the neutral control and improving both of the fuel-efficiency and the NVH due to the reduction in the planetary gear noise and vehicle vibration.

According to various embodiments of the present invention, it is possible to greatly improve the planetary gear noise at the time of the neutral control during the D-stage temporary stop of the automatic transmission vehicle including the planetary gear sets by using the change in the D-stage engine RPM divided into the application of the neutral control and the non-application of the neutral control so as to reduce the planetary gear noise and the vehicle vibration of the automatic transmission vehicle configured of the planetary gear sets.

Further, according to various embodiments of the present invention, it is possible to improve the NVH due to the reduction in the planetary gear noise and the vehicle vibration while improving the fuel-efficiency due to the neutral control at the time of the D-stage temporary stop of the automatic transmission vehicle including the planetary gear sets.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for improving fuel-efficiency during a temporary stop, comprising:
    (A) dividing, by an engine control apparatus, a neutral control condition into a neutral control entry and a neutral control release during a D-stage temporary stop;
    (B) determining, a neutral control entry D-stage target RPM at a time of the neutral control entry, and a neutral control release D-stage target RPM at a time of the neutral control release; and
    (C) performing a neutral control after the neutral control entry comprises:
        (c-1) determining an entry neutral control target RPM in a map built with a neutral control D-stage target RPM depending on a cooling water temperature by the engine control apparatus;
        (c-2) determining whether after the neutral control entry, a predetermined time elapses; and
        (c-3) performing RPM shifting using the neutral control entry D-stage target RPM as the entry neutral control target RPM after an elapse of the predetermined time after the neutral control entry, while before the elapse of the predetermined time after the neutral control entry, the RPM shifting is performed using the neutral control entry D-stage target RPM as a release neutral control target RPM determined under a condition of the neutral control release and the entry neutral control target RPM considering a clutch release time.

2. The method of claim 1, wherein in the (B), the neutral control entry D-stage target RPM and the neutral control release D-stage target RPM are determined in the map built with the neutral control D-stage target RPM depending on the cooling water temperature.

3. The method of claim 1, wherein the elapse of the predetermined time after the neutral control entry is the clutch release time of a transmission by the transmission control apparatus.

4. The method of claim 1, wherein the neutral control D-stage target RPM determined after the elapse of the predetermined time after the neutral control entry is determined as $N_1 target = N1$, wherein the $N_1 target$ represents the neutral control D-stage target RPM before the release time and N1 represents the entry neutral control target RPM.

5. The method of claim 1, wherein the neutral control D-stage target RPM determined before the elapse of the predetermined time after the neutral control entry is determined as $N_2 target = N_1 target + (N1 - N2M)/T1$, wherein the $N_2 target$ represents the neutral control D-stage target RPM after the release time, the $N_1 target$ represents the neutral control D-stage target RPM before the release time, the N1 represents the entry neutral control target RPM, the N2M represents the release neutral control target RPM, and the T1 represents the clutch release time.

6. A method for improving fuel-efficiency during a temporary stop, comprising:
    (A) dividing, by an engine control apparatus, a neutral control condition into a neutral control entry and a neutral control release during a D-stage temporary stop;
    (B) determining, a neutral control entry D-stage target RPM at a time of the neutral control entry, and a neutral control release D-stage target RPM at a time of the neutral control release; and
    (C) performing the neutral control release after the neutral control entry comprises:
        (c-1a) determining a release neutral control target RPM in a map built with a neutral control D-stage target RPM depending on cooling water temperature by the engine control apparatus;
        (c-1b) determining whether the neutral control release is performing;
        (c-2a) determining whether a predetermined time elapses after a neutral control release entry when the neutral control release is performing; and
        (c-3a) performing RPM shifting using the neutral control release D-stage target RPM as the release neutral control target RPM after the elapse of the predetermined time after a neutral control release complete state or the neutral control release entry, while after the elapse of the predetermined time after the neutral control release entry, the RPM shifting is performed using the neutral control release D-stage target RPM as an entry neutral control target RPM determined under a condition of the neutral control release and the release neutral control target RPM considering a clutch release time.

7. The method of claim 6, wherein the elapse of the predetermined time after the neutral control release is a clutch coupling time of a transmission by the transmission control apparatus.

8. The method of claim 6, wherein the neutral control D-stage target RPM determined after the elapse of the predetermined time after the neutral control release is determined as $N_1 target=N2$, wherein the $N_1 target$ represents the neutral control D-stage target RPM before the coupling time and N2 represents the release neutral control target RPM.

9. The method of claim 6, wherein the neutral control D-stage target RPM determined before the elapse of the predetermined time after the neutral control release is determined as $N_2 target=N_1 target+(N2-N1M)/T2$, wherein the $N_2 target$ represents the neutral control D-stage target RPM after the coupling time, the $N_1 target$ represents the neutral control D-stage target RPM before the coupling time, the N2 represents the release neutral control target RPM, the N1M represents the entry neutral control target RPM, and the T2 represents the clutch coupling time.

10. A vehicle in which is embodied a method for improving fuel-efficiency during a temporary stop, comprising:
   an engine control apparatus configured to control an engine, determine a neutral control entry D-stage target RPM and a neutral control release D-stage target RPM under a neutral control condition determined during a D-stage temporary stop, and include a first memory storing a first control value;
   a transmission control apparatus configured to control a transmission, perform a clutch release at a time of a neutral control entry performed and a clutch coupling at a time of a neutral release during the D-stage temporary stop, include a second memory storing a second control value, and mutually communicate with the engine control apparatus to provide a clutch release time and a clutch coupling time to the engine control apparatus; and
   a data detection apparatus configured to provide detection values detected by an engine RPM sensor, an accelerator pedal position sensor, a gear position sensor, a vehicle speed sensor, a transmission input speed sensor, a transmission output speed sensor, an acceleration sensor, a brake pressure sensor, and a cooling water temperature sensor, respectively, as input data of the engine control apparatus and the transmission control apparatus, respectively,
   wherein the method for improving fuel-efficiency during the temporary stop, comprises:
   (A) dividing, by the engine control apparatus, the neutral control condition into the neutral control entry and a neutral control release during the D-stage temporary stop;
   (B) determining, the neutral control entry D-stage target RPM at a time of the neutral control entry, and the neutral control release D-stage target RPM at a time of the neutral control release; wherein in the (B), the neutral control entry D-stage target RPM and the neutral control release D-stage target RPM are determined in a map built with a neutral control D-stage target RPM depending on cooling water temperature;
   (C) performing a neutral control after the neutral control entry comprises:
   (c-1) determining an entry neutral control target RPM in the map built with the neutral control D-stage target RPM depending on the cooling water temperature by the engine control apparatus;
   (c-2) determining whether after the neutral control entry, a predetermined time elapses; and
   (c-3) performing a RPM shifting using the neutral control entry D-stage target RPM as the entry neutral control target RPM after an elapse of the predetermined time after the neutral control entry, while before the elapse of the predetermined time after the neutral control entry, the RPM shifting is performed using the neutral control entry D-stage target RPM as a release neutral control target RPM determined under a condition of the neutral control release and the entry neutral control target RPM considering the clutch release time.

11. The vehicle of claim 10, wherein the engine control apparatus is provided with the map considering the cooling water temperature and determines the neutral control entry D-stage target RPM and the neutral control release D-stage target RPM using the map.

12. The vehicle of claim 10, wherein the engine control apparatus is an engine electronic control unit (ECU), the transmission control apparatus is a transmission control unit (TCU), and the transmission is an automatic transmission being/having the clutch, a planetary gear set, and a pressure control apparatus.

* * * * *